(No Model.)

F. FULLNER.
GALVANIC BATTERY.

No. 522,559. Patented July 3, 1894.

Witnesses,
Thos. F. Sheridan
Annie C. Courtenay

Inventor.
Franz Fullner
By Banning & Banning & Payson
Attorneys

UNITED STATES PATENT OFFICE.

FRANZ FULLNER, OF CHICAGO, ILLINOIS.

GALVANIC BATTERY.

SPECIFICATION forming part of Letters Patent No. 522,559, dated July 3, 1894.

Application filed August 28, 1893. Serial No. 484,201. (No model.)

*To all whom it may concern:*

Be it known that I, FRANZ FULLNER, a subject of the Emperor of Germany, who have made application to become a citizen of the United States, residing at Chicago, Illinois, have invented certain new and useful Improvements in Galvanic Batteries, of which the following is a specification.

The object of my invention is to provide a simple, economical and efficient galvanic battery; and it consists in the combinations, arrangements and details hereinafter described and claimed.

Figure 1:
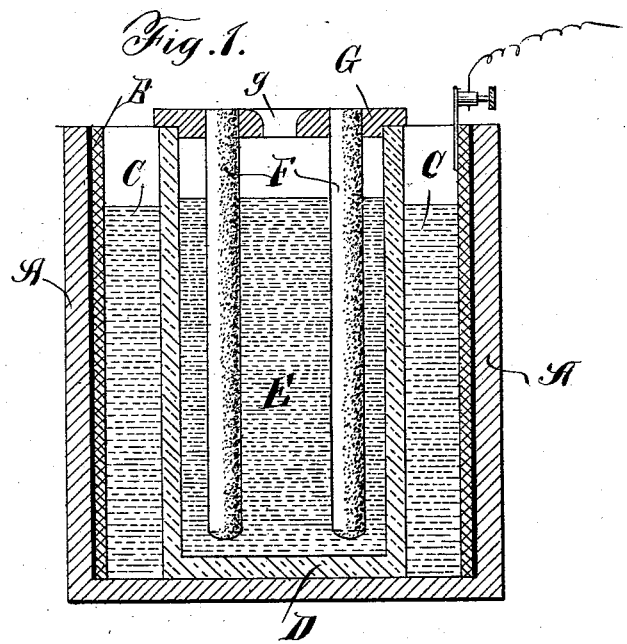
Figure 2:
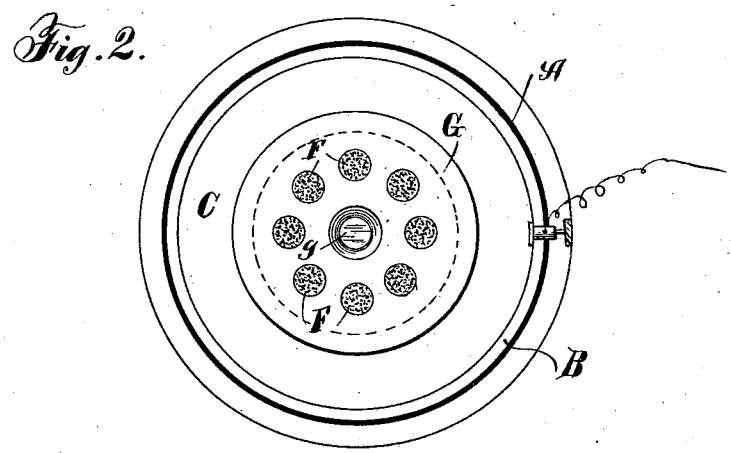

In the drawings, Figure 1 is a vertical section of my improved form of battery; and Fig. 2 a plan view of the same, looking at it from the top.

My invention relates particularly to that kind of battery which is known as a two-fluid cell, and is designed to be an improvement on the class known as the Bunsen, Grove and Fuller cells.

In making my improved battery, I use an outer containing cell, A, formed of any desirable material, preferably glazed porcelain, and in it place an annular zinc cylinder, B, which may easily fit the inner diameter of the containing cell and which forms the positive electrode of the battery. I nearly fill this cell with a solution of crude potash, C, the proportion being about one pound to seven quarts of water. I then insert a porous jar, D, in the containing cell, and nearly fill it with a strong solution of sulphuric acid, E, about four parts of sulphuric acid and three parts of water, adding a small quantity of nitrate of soda. In this solution, I place the carbon or negative electrodes, F, preferably carbon sticks which are supported at their upper ends by a lead cap, G, which closely fits the porous cup and is provided with a central opening, $g$, for the purpose of adding to the solution in the cup, or re-filling the same without taking the electrodes out of the cylinder. This cap also prevents splashing of the solution when the battery is being moved from place to place, thereby avoiding the mixture of the solutions. The carbons or negative electrodes preferably consist of carbon sticks arranged in a circle. It is not necessary to explain my theory or the chemical actions of the battery, which will be clear to those skilled in the art without any further description than given in the specification. I have obtained from my battery a very high electro motive force at the start, which remains very constant throughout the entire life of the battery, giving a greater number of ampère hours than I have ever obtained from any other form of battery which I have used, thus making it especially adapted for use in electric lighting and as a source of electric energy.

I am aware that different patents have been granted for two-fluid cells in which there is a porous jar, and in which carbon forms one electrode and zinc the other; but they are unlike mine in construction, in that the elements of my battery are essentially different.

I claim—

A galvanic battery consisting of a zinc element in a solution of potash, the proportions being, substantially, one pound of potash to seven quarts of water, and a carbon element in a porous cup containing a solution of sulphuric acid and nitrate of soda, the proportions being, substantially, four parts of sulphuric acid, three parts of water and one part nitrate of soda, substantially as described.

FRANZ FULLNER.

Witnesses:
THOMAS F. SHERIDAN,
JULIUS MOSES.